US012529606B2

(12) United States Patent
Odell (10) Patent No.: US 12,529,606 B2
(45) Date of Patent: Jan. 20, 2026

(54) STACKED ACTIVE THICK FILM DEVICE (71) Applicant: United States Department of Energy, Washington, DC (US)

(72) Inventor: Randall N. Odell, Schenectady, NY (US)

(73) Assignee: U.S. Department of Energy, Washington, DC (US)

(*) Notice: Subject to any disclaimer, the term of this patent is extended or adjusted under 35 U.S.C. 154(b) by 620 days.

(21) Appl. No.: 17/948,405

(22) Filed: Sep. 20, 2022

(65) Prior Publication Data

US 2023/0296445 A1 Sep. 21, 2023

Related U.S. Application Data (60) Provisional application No. 63/248,079, filed on Sep. 24, 2021.

(51) Int. Cl.
G01K 1/143 (2021.01)
G01K 1/02 (2021.01)
G01K 7/22 (2006.01)

(52) U.S. Cl.
CPC ............. *G01K 1/143* (2013.01); *G01K 1/026* (2013.01); *G01K 7/22* (2013.01)

(58) Field of Classification Search
CPC ........... G01K 1/143; G01K 1/026; G01K 7/22
See application file for complete search history.

(56) References Cited

U.S. PATENT DOCUMENTS

| 5,665,262 A * | 9/1997 | Hajaligol | A24F 40/46 131/194 |
| 6,037,572 A * | 3/2000 | Coates | H05B 1/0263 219/465.1 |
| 6,270,638 B1 * | 8/2001 | Kaneko | G01N 27/4065 219/486 |
| 2002/0100697 A1 * | 8/2002 | Quinn | G01N 27/4071 204/426 |
| 2016/0077044 A1 * | 3/2016 | Arkenberg | C22C 29/12 205/781 |
| 2019/0033248 A1 * | 1/2019 | Arkenberg | G01N 27/4162 |

FOREIGN PATENT DOCUMENTS

| EP | 0853239 | * 7/1998 |
| JP | H06324586 | * 11/1994 |
| JP | H11166913 | * 6/1999 |

OTHER PUBLICATIONS

JPH06324586 (Year: 1994).*
JPH11166913 (Year: 1999).*

* cited by examiner

*Primary Examiner* — Kyung S Lee
(74) *Attorney, Agent, or Firm* — Robert T. Burns; Jonathan Parthum; Jennifer R. Mahalingappa (57) ABSTRACT

Disclosed is a stacked thick film device including a substrate, a first active element, a second active element, and an insulating dielectric layer separating the first active element and the second active element.

22 Claims, 8 Drawing Sheets

STACKED ACTIVE THICK FILM DEVICE

CLAIM TO PRIORITY

This application claims priority to U.S. Provisional Patent Application Ser. No. 63/248,079 filed Sep. 24, 2021, the entirety of which is herein incorporated by reference.

NOTICE OF GOVERNMENT RIGHTS

The United States Government has rights in this application and any resultant patents claiming priority to this application pursuant to contract DE-NR0000031 between the United States Department of Energy and Fluor Marine Propulsion Corporation Knolls Atomic Power Laboratory.

FIELD

The present subject matter relates generally to multidimensional circuits on a substrate. More specifically, the present subject matter relates to stacked film electrical devices.

BACKGROUND

It is often desirable to be able to measure heat transfer, thermodynamic, and/or hydraulic conditions. Conditions of interest include but are not limited to temperature, boiling initiation, critical heat flux, and droplet impingement on a heated surface. In certain instances, heat transfer is accomplished by a coolant flowing across a heated surface. In certain instances, it is desirable to manipulate heat input (remotely in certain instances) and/or measure thermal hydraulic response (in real time in certain instances). In certain instances, it is desirable for the heating and/or measurement to have a negligible effect on coolant flow and/or heat transfer, thermodynamic, and/or hydraulic conditions. In certain instances, it is desirable to perform heating and measurement simultaneously without one interfering with the other and, in certain instances, it is desirable to have the heating and measurement devices collocated on a heated surface.

While direct measurement at the heated surface is often preferred, many sensor devices perturb the flow field due to their size (≥0.005"/127 microns). To avoid flow perturbations or other conditions that disturb measurement, certain devices use electrical resistance heating and a separate thermocouple device mounted to a back wall surface (i.e., a surface external to coolant flow). Back wall mounting is used to avoid perturbing phenomena of interest occurring on a front wall (i.e., a surface in at least partial contact with a coolant).

Back wall measurement techniques have at least two drawbacks. First, measurement signals are affected during transmission through the wall as a function of wall material and thickness. Measurement instruments in a back wall configuration are on the opposite side of the body from the measurement location of interest. Back wall instruments can therefore only infer conditions on a front wall, relying on thermal conductivity through a back wall to infer conditions at the front wall heat transfer surface. The measurement is therefore significantly limited by back wall conduction path properties.

A second drawback to back wall measurement is that the back wall must be accessible. Even non-contact techniques such as optical and/or infrared measurement, for example, require a clear line of sight to the back wall (such as the outside surface of a pipe with fluid flow and heat transfer occurring on the inside) to measure thermal or optical radiation emanating from the back surface to infer thermodynamic characteristics at the actual heat transfer surface. These techniques require thermally transparent materials and/or line-of-sight access, with room for cameras that are often at least several inches in size. In many applications, however, the back wall is not accessible for instrumentation mounting and/or observation. This is because access to a heat transfer surface is often limited by surrounding structure, making it difficult to measure thermal hydraulic conditions at the heat transfer surface itself. One example of a configuration limiting these alternatives is a tight bundle of heat exchanger tubes where outer tubes prevent line-of-sight access to inner tubes, making line-of-sight measurement of the inner tubes impractical. In these instances, measurement techniques are limited to back wall surface-mounted devices, as existing optical and/or radiation-based measuring techniques are impractical due to the inability to access the measurement site. A need therefore exists for an apparatus and method to measure thermal hydraulic conditions at a heat transfer surface of a heated body with negligible impact on heat transfer, thermodynamic, and/or hydraulic conditions.

SUMMARY

Disclosed is a stacked thick film device including a substrate, a first active element, a second active element, and an insulating dielectric layer separating the first active element and the second active element. Certain embodiments disclose a stacked active element thick film device having at least two active elements separated by a dielectric layer with the at least two active elements configured for independent function at the same (coincident) location on a substrate surface. In certain embodiments, the at least two active elements are vertically stacked. In certain embodiments the at least two vertically stacked active elements are collocated on a substrate. Certain embodiments disclose a stacked active element which includes a thermistor element and a heater element, with the stacked active element configured to do one or more of: measure temperature of a heated surface, detect boiling initiation at the surface, detect onset of critical heat flux, and detect impingement of coolant droplets on areas of the heated surface where at least a portion of the coolant has vaporized.

Certain embodiments disclose a dielectric layer separating a first active element stacked under the second active element, with the first active element and the second active element configured for independent function at the same (coincident) location. In certain embodiments the location is at a heated surface, and in certain embodiments the location is a substrate surface.

In certain exemplary embodiments at least one measurement element is separated from a heating element by a dielectric. In certain embodiments, the dielectric has homogeneous thermal properties. Certain of these exemplary embodiments have an improved response time, accuracy, and an ability to correct for insulator properties. In these exemplary embodiments the insulator electrically separates the collocated heating and measuring devices. The insulator layer is characterized using a mathematical model of the heater, insulator, and sensor layers, which approximates the components' geometric and thermal properties in a mathematical model. From this model the insulation layer effects are isolated and accounted for in the measurement output. Certain embodiments of the present subject matter are at least partially on a heat transfer surface, with certain exemplary embodiments entirely on a heat transfer surface such that the measured values represent the underlying heater temperature more accurately than remote devices, and with minimal influence from non-heater factors and/or other factors external to the item being measured.

In certain exemplary embodiments, at least one measurement element is located at a heat transfer surface between a heat source and a cooling fluid to improve measurement response time and/or accuracy. In certain exemplary embodiments at least one measurement element is no more than nine microns thick and has a minimal thermal mass. In certain other exemplary embodiments is no more than fifteen microns thick and has a minimal thermal mass.

In certain exemplary embodiments, the stacked active element is scalable to different sizes, different circuit patterns, and/or configurable to conform to one or more substrate surfaces.

BRIEF DESCRIPTION OF THE FIGURES

A description of the present subject matter including various embodiments thereof is presented with reference to the accompanying drawings, the descriptions not intended to be considered limiting in any matter, wherein.

DETAILED DESCRIPTION

Throughout the discussion below, use of the terms "about" and "approximately" are used to indicate engineering tolerances which would be well understood by a person of ordinary skill in the art for any particular application or embodiment. Further, while an order of the method steps is provided, this order is exemplary only; as will be recognized by those of skill in the art, the order of the method steps may be varied without impacting the overall efficacy of the method. Moreover, while items are listed in the specification as, for example, "first", "second", or "third" this is used to distinguish one items from another but is not meant to indicate any relative order of the items disclosed.

Figure 1:
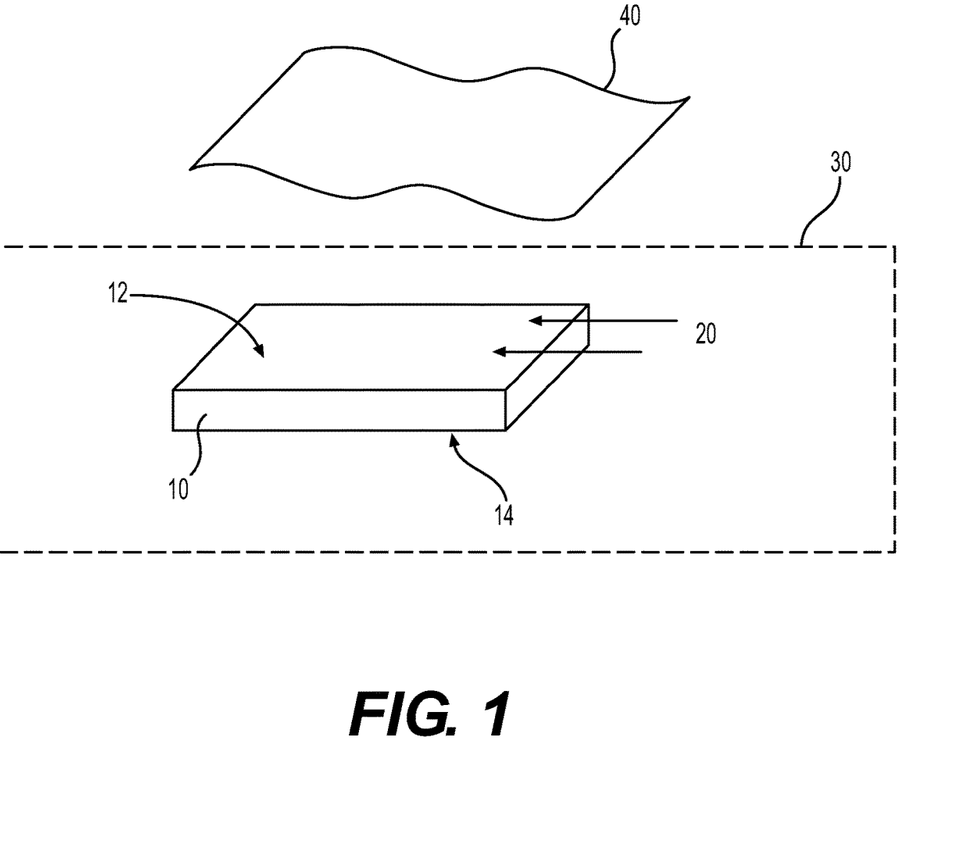
FIG. 1 illustrates a heated body in a measured environment.

FIG. 1 illustrates a heated body 10 in a measured environment 30. A stacked thick film device is not shown in FIG. 1, as the figure is included to show an example of an environment in which a thick film device is used. As shown in FIG. 1, heated body 10 includes a heat transfer surface 12 and a back wall surface 14, with coolant 20 flowing over at least a portion of heat transfer surface 12. In this exemplary embodiment, the sensed environment 30 is located at or near a geometric obstruction 40.

Figure 2:
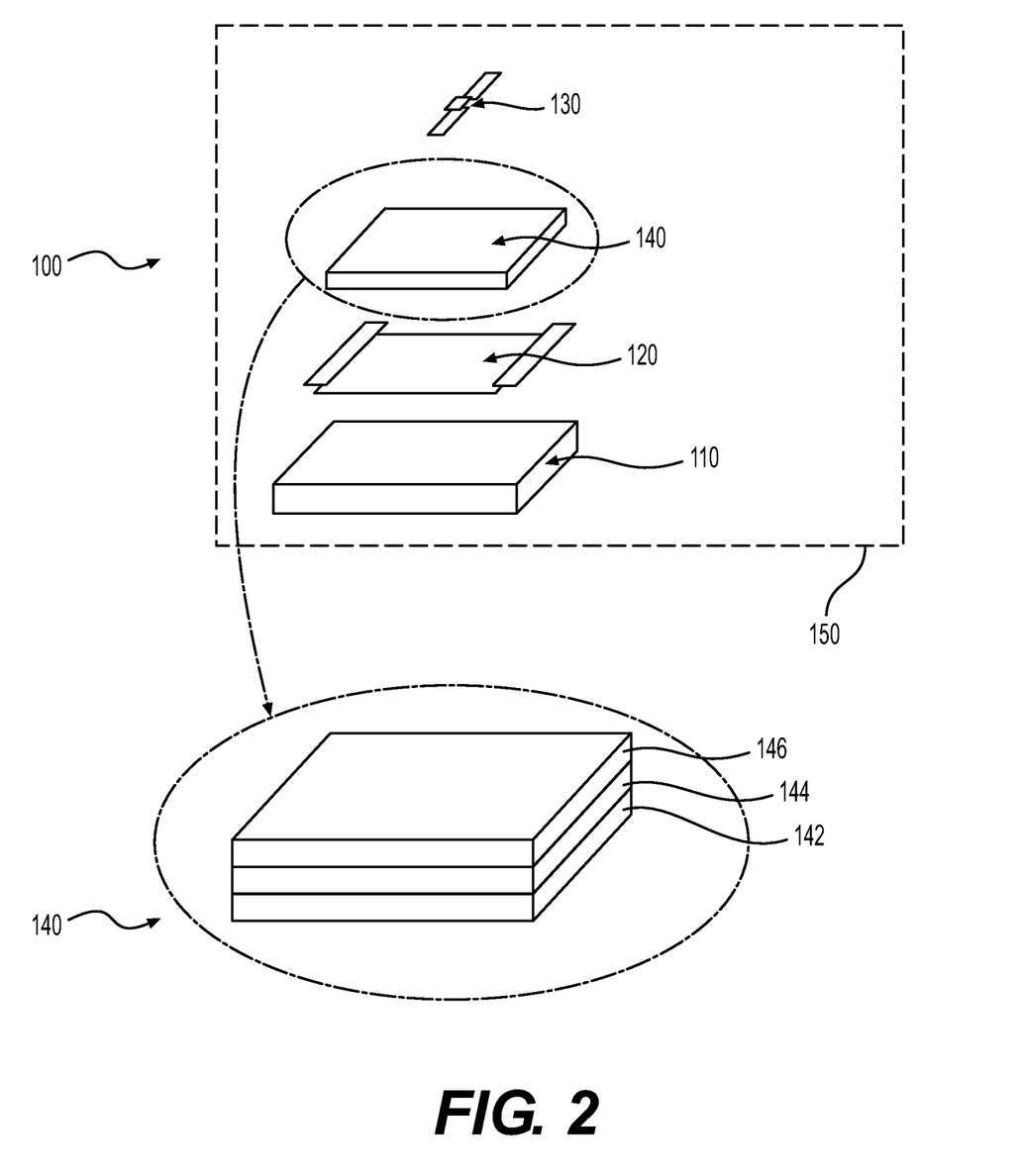
FIG. 2 illustrates an exemplary embodiment of a stacked thick film device.
Figure 5:
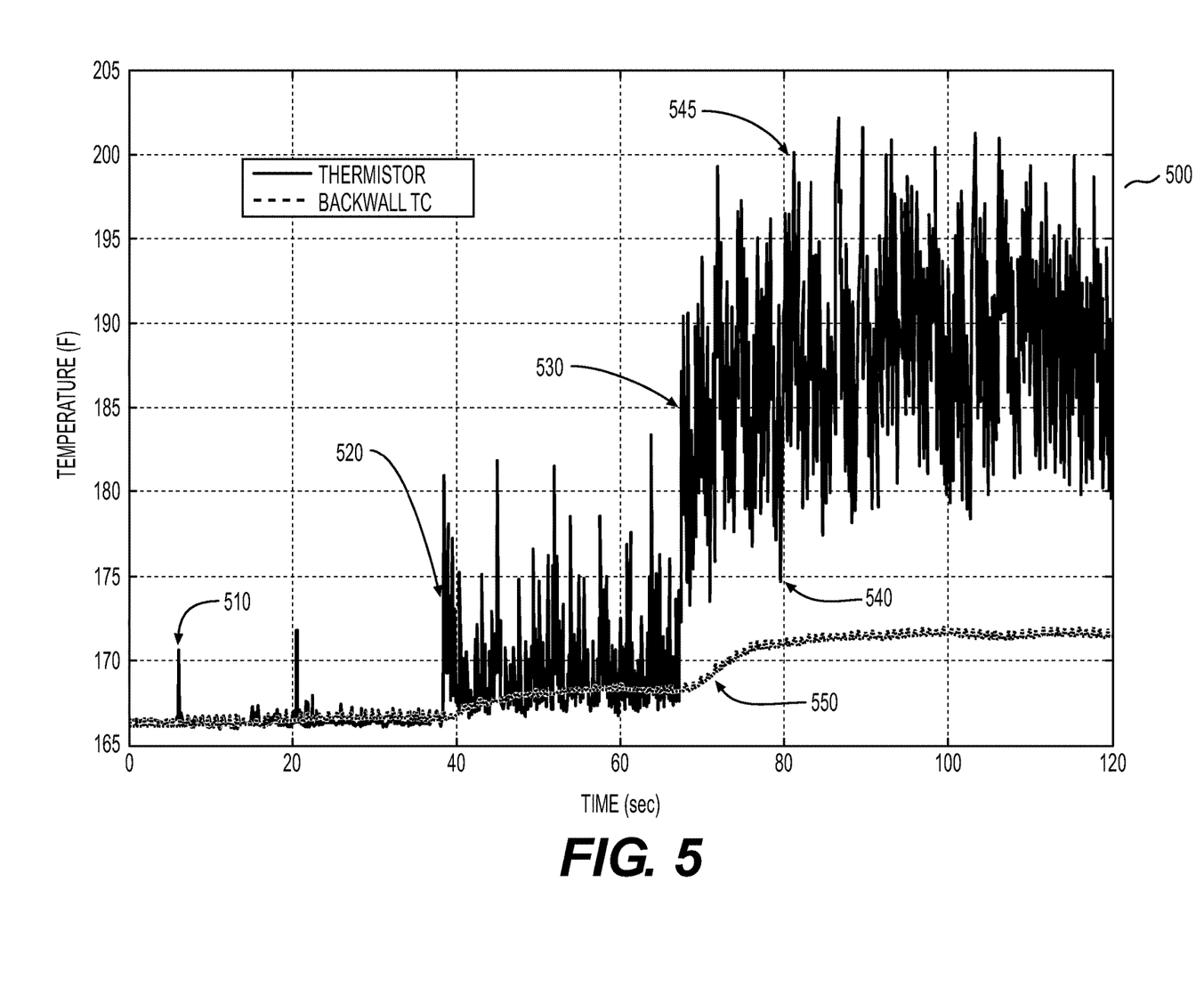
FIG. 5 illustrates an exemplary stacked thick film device measurement output.

FIG. 2 illustrates an exemplary embodiment of a stacked thick film device 100. As shown in FIG. 2, stacked thick film device 100 ("device 100") includes a substrate 110, a first active element 120, a second active element 130 vertically stacked over first active element 120, and an insulating dielectric layer 140 separating first active element 120 and second active element 130. Certain exemplary embodiments optionally include an encapsulation film 150, which is discussed in more detail at the end of the detailed description of FIG. 2. Certain exemplary embodiments include a multilayer thick film construction on a large format rigid engineered substrate deposited with multiple high voltage (tested up to 600 Vdc) resistive heating elements with integral surface temperature measurement devices. Certain aspects of the present subject matter include a thick film build up on a rigid engineered substrate having a resistive layer, one or more dielectric layers, and one or more measurement circuits in thermal and/or hydraulic contact with a measured environment. In certain embodiments, one or more measurement circuits are in at least partial direct thermal and/or hydraulic contact with the measured environment. In certain exemplary embodiments, the thick film stack is configured to withstand several thousand rapid thermal cycles of several hundred degrees. In certain exemplary methods, measurement elements are sized such that they have a minimal thermal mass (i.e., the thermal mass of the measurement elements does not appreciably impact the operation and response of the resistive elements). Some exemplary embodiments also have very high temporal response (approximately six microseconds) with a strong signal to noise ratio. An exemplary stacked thick film device measurement output is illustrated in FIG. 5.

In certain embodiments, substrate 110 is a large format rigid engineered substrate, and in certain embodiments substrate 110 is ceramic. Other materials known to those of skill in the art can be used in place of and/or in addition to ceramic in substrate 110 without departing from the scope of the present subject matter. In the exemplary embodiment shown, substrate 110 is yttria stabilized zirconia ceramic with 20 micro-inch Ra or smoother surface finish and free-state flatness within 25 microns/150 centimeters. Other substrates known to those of skill in the art, such as alumina substrates with similar flatness and smoothness for example, can be used in place of or in addition to ceramic without departing from the scope of the present subject matter.

In the exemplary embodiment of FIG. 2, first active element 120 is a heater in the form of a resistive film. In this embodiment, at least one resistive film is applied as a paste in accordance with manufacturer's processing parameters specified on the product data sheet. This method is exemplary only, as other application methods known to those of skill in the art can be employed without departing from the scope of the present subject matter. In the embodiment shown, first active element 120 includes a gold conductor having a fired thickness of at least eight microns. Certain embodiments include one or more high voltage (up to 600 Vdc) resistive heating elements (see, e.g., FIG. 3 element 322). In the embodiment shown in FIG. 2, the resistive film has a sheet resistive value and film uniformity which, in certain exemplary embodiments, is empirically optimized to meet desired electrical and mechanical design parameters without post processing. This avoids the need for laser trimming or similar area modification methods, which are not feasible due to potential damage this could cause to any overlaying dielectric(s). In certain exemplary embodiments first active element 120 is a resistor having a printed thickness of less than fifteen microns to prevent delamination, as it was discovered that having layers of fifteen microns or less prevented delamination of elements 120, 130, and/or 140.

In the exemplary embodiment of FIG. 2, second active element 130 includes at least one measurement element. In certain exemplary embodiments of present subject matter, second active element 130 is at least partially collocated on heated surface 12, with certain exemplary embodiments having second active element 130 entirely collocated on heat transfer surface 12. In certain embodiments, first active element 120 and second active element 130 are least partially vertically collocated over each other. Additional details of second active element 130 are provided in the detailed descriptions of FIGS. 4A-4C below.

The exemplary embodiment of FIG. 2 also includes at least one insulating dielectric layer 140. The overall thickness in this exemplary embodiment is optimized for dielectric breakdown strength sufficient to withstand thermal input from a 600 VDC heater. Heaters having other thermal inputs and/or other thicknesses can be selected by those of skill in the art without departing from the scope of the present subject matter. In certain exemplary embodiments second active element 130 is separated from first active element 120 by a dielectric layer 140 having homogeneous thermal properties. Back wall thermocouples (not shown) are separated, in contrast, from measured environment 30 by back wall 14, which often has unknown or non-homogeneous thermal properties.

In certain exemplary embodiments, dielectric layer 140 includes three sublayers 142, 144, and 146 with different orientations, for a total fired thickness of 32-40 microns and a 1000 Vdc minimum electrical breakdown strength. Other films (in place of or in addition to the film above) can be used without departing from the scope of the present subject matter. In this exemplary embodiment, each of the dielectric layers 142/144/146 is applied with a different printing screen orientation relative to the other layers. This improves the dielectric capacity by reducing the potential for aligned defects from one layer through to the next. In certain exemplary embodiments, two of the sublayers have a standard viscosity (as defined by the manufacturer), with the third sublayer having a reduced viscosity to improve flow into defects and to reduce the probability of pinholes. Pinholes are voids in the dielectric layer through which electric charge may pass and defeat the function of the dielectric to prevent electric communication between active circuits above and below the dielectric layer(s). In certain embodiments, screen orientation is varied by at least twenty degrees between sublayers to minimize the potential for aligned pinholes. This viscosity configuration and screen orientation is exemplary only, as other viscosities and/or screen orientations can be selected by those of skill in the art without departing from the scope of the present subject matter.

In certain exemplary embodiments, dielectric layer 140 electrically separates first active element 120 from second active element 130. This configuration allows independent function of first active element 120 and second active element 130 which, in certain exemplary embodiments, are at least partially vertically collocated at the same (coincident) location on substrate 110. These exemplary configurations enable independent operation of the heating and temperature measurement functions, with separate electric circuits (not shown) for heat input and temperature measurement, enabling independent function of heating and temperature measurement. Electrically isolating first active element 120 from second active element 130 and placing second active element 130 on top of dielectric 140 enables independent heating and measurement, with independent temperature control and monitoring in a format that does not interrupt heater uniformity. In certain exemplary embodiments, a measurement circuit 135 (see, e.g., FIG. 4A) measures temperature based on a second active element 130 thermal coefficient of resistance and environmental temperature. Other devices, in contrast, typically have only one circuit (not shown) both producing heat and measuring resistance to calculate estimated temperature across heated surface 12. The sensor(s) on those devices must be horizontally or laterally separated from the heating element(s). They therefore require either remote sensing (i.e., measurement not near the heater surface), or line of sight instrument access (which may not be feasible) or sensing devices of a size relative to the heater that cause significant measurement perturbations.

The exemplary embodiment of FIG. 2 optionally includes encapsulation film 150 covering device 100. Encapsulation film 150 improves the thermistor material electrical response during the boiling phase transition. In certain exemplary embodiments, encapsulation film 150 is a glass encapsulant covering device 100. Other encapsulation films 150 known to those of skill in the art may be used without departing from the scope of the present subject matter. The encapsulation film in these embodiments is applied using one or more techniques known to those of skill in the art. In still other exemplary embodiments device 100 is configured to be surface mounted.

Figure 3:
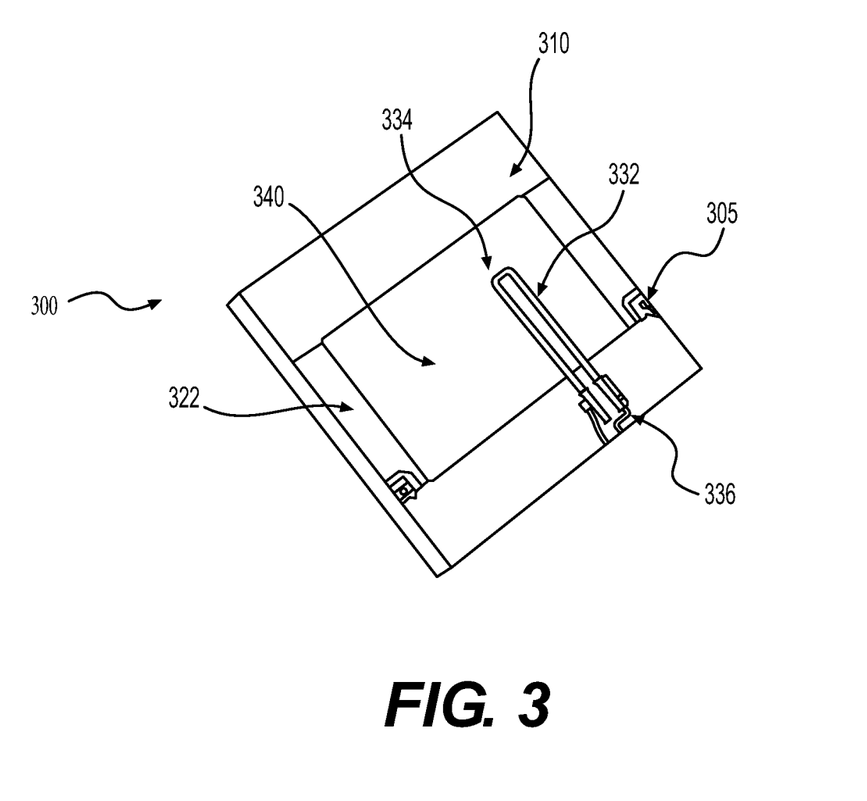
FIG. 3 illustrates another exemplary embodiment of a stacked thick film device.

FIG. 3 illustrates another exemplary embodiment of a stacked thick film device 300. In this exemplary embodiment, substrate 310 is ceramic and has a power attachment 305 connecting to at least one of first active element 320 and second active element 330. Other materials known to those of skill in the art can be used in place or and/or in addition to ceramic without departing from the scope of the present subject matter. In the exemplary embodiment shown, first active element 320 includes a heating element 322. Also in this exemplary embodiment, second active element 330 includes a thermistor bus bar 332 and an instrument wire attachment point 336 for connecting with second active element 334, with first active element 320 and second active element 334 separated by a dielectric 340.

Figure 4A:
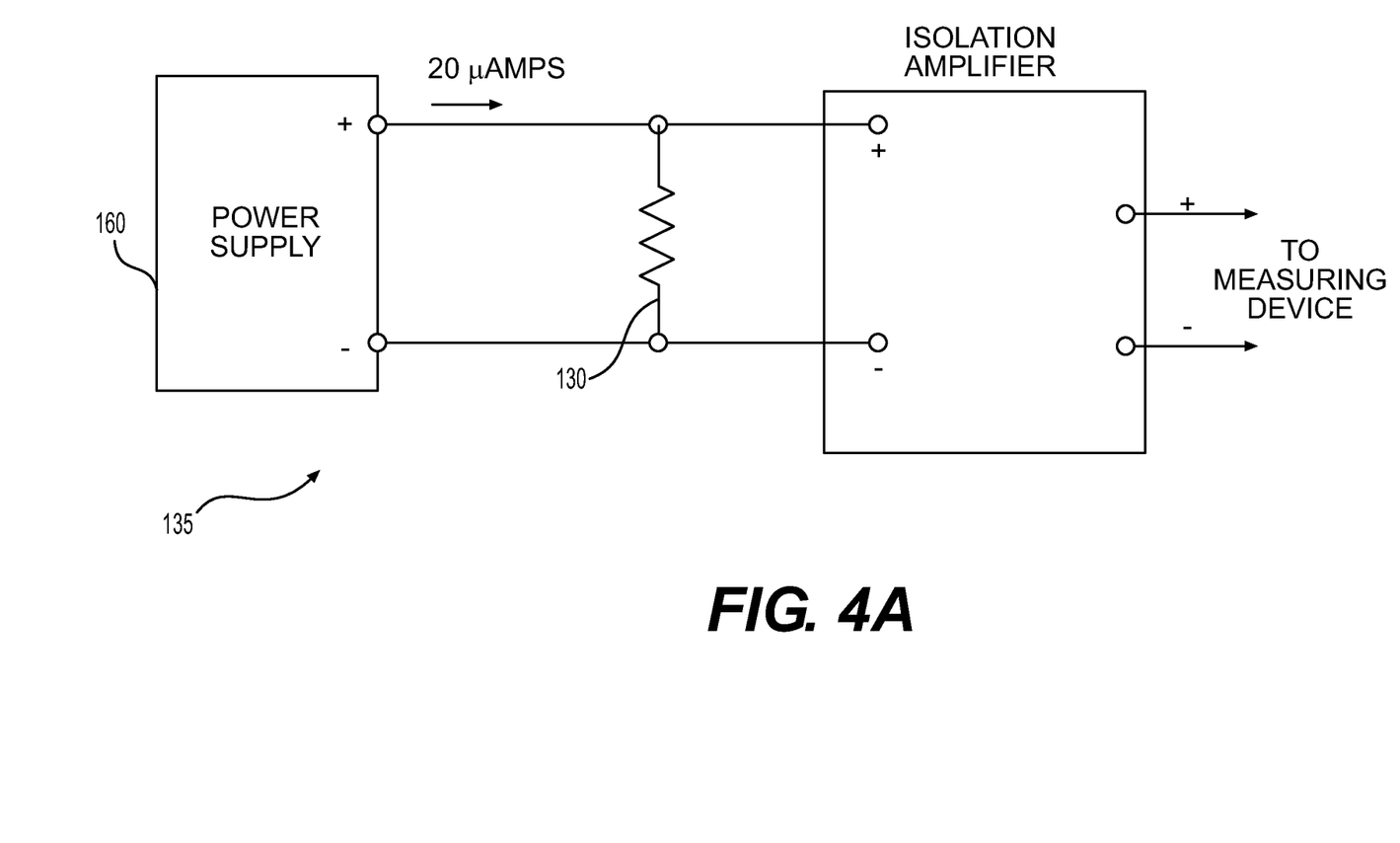
FIG. 4A illustrates an exemplary embodiment of a measurement circuit.
Figure 4B:
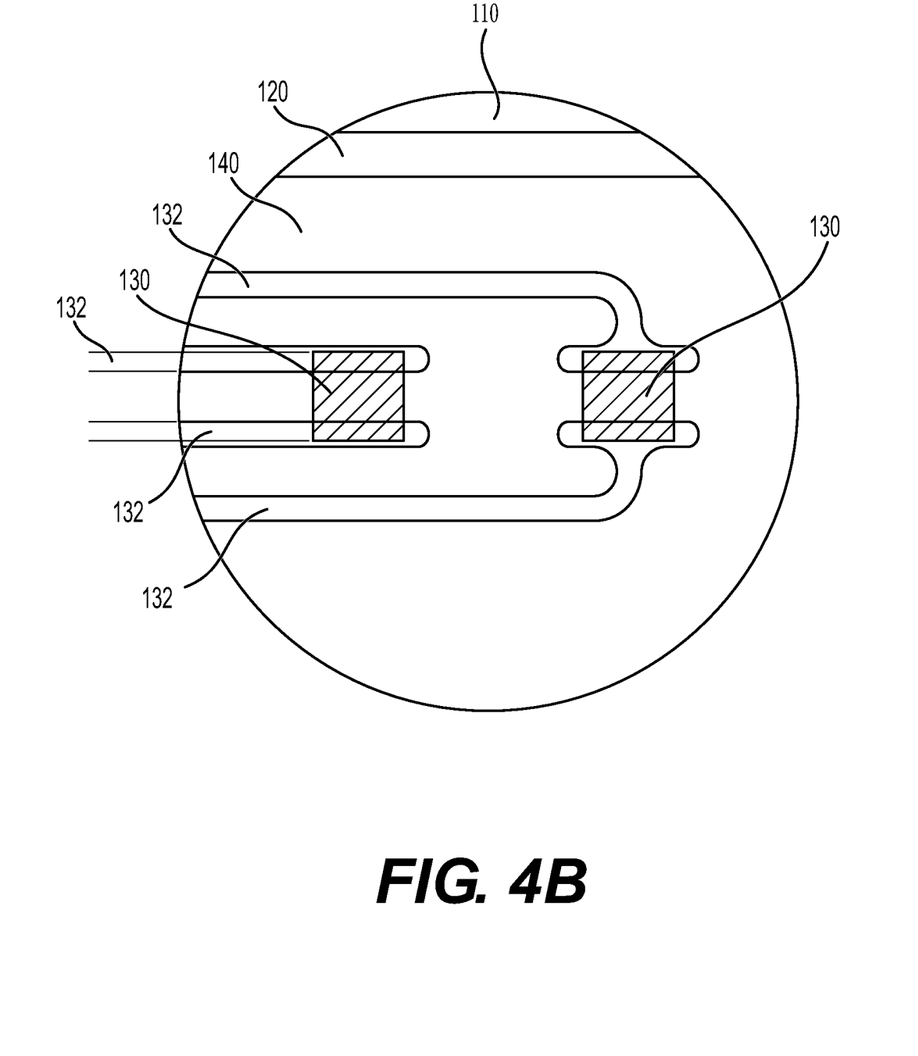
FIGS. 4B and 4C illustrate exemplary embodiment of measurement circuit layouts.
Figure 4C:
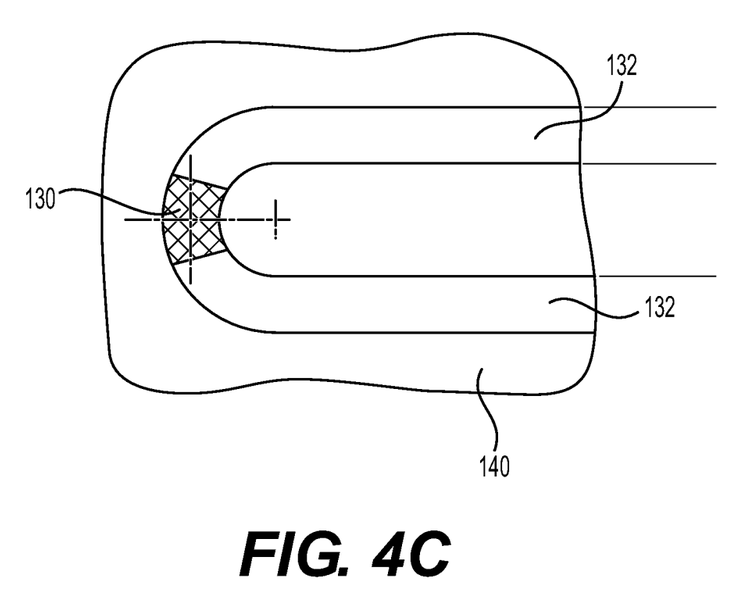

FIGS. 4A-4C illustrate exemplary embodiments of second active element 130, with FIG. 4A illustrating an exemplary embodiment of a second active element 130 circuit, and FIGS. 4B and 4C illustrating exemplary circuit layouts. As illustrated in these embodiments, second active element 130 is configured to be in at least partial thermal contact with heat transfer surface 12 and coolant 20. In the embodiments shown, the at least one second active element 130 includes a thermistor bus bar 132 (see, e.g., FIG. 4B) and at least one measurement circuit 135 (see, e.g., FIGS. 4B and 4C) configured to be in at least partial thermal contact with a sensed environment 30. The thermal contact can, but need not be, direct thermal contact. In certain embodiments, second active element 130 output voltage is related to temperature using a pointwise calibration of thermistor resistances at known temperatures. In certain exemplary embodiments, the thermistor has a temporal response of approximately six microseconds or less. In other exemplary embodiments, the thermistor is a film having a resistance between 25 k$\Omega$ and 60 k$\Omega$ at 21 degrees centigrade and is stabilized at 150 degrees C.±10 degrees C. for approximately 24 hours. Other thermistor materials known to those of skill in the art could be used in place of or in addition to this material without departing from the scope of the present subject matter. In certain exemplary embodiments, second active element 130 has a minimal thermal mass (i.e., it has a negligible ability to absorb, store and/or release heat) and is no more than nine microns thick. In certain exemplary embodiments, second active element 130 has a minimal thermal mass and is no more than fifteen microns thick.

In certain embodiments, at least a portion of the second active element 130 is in thermal contact with measured environment 30. This contact can, but need not be, direct. In conventional sensors, in contrast, deposition of a second active element on top (coincident) of a first active element (i.e., resistor, dielectric, resistor combination) is discouraged due to problems with film instability during the firing process. As discussed above it was discovered that, with the present subject matter, having layers of fifteen microns or less minimized delamination of the layers.

In certain exemplary embodiments, at least one second active element 130 connects to a power supply 160 (see, e.g., FIG. 4A). In certain embodiments, power supply 160 is a precision constant current power supply with voltage monitoring. Certain of these embodiments include a twenty microamp input based on room temperature circuit resistance and desired sensitivity. This power supply is exemplary only, as other power supplies known to those of skill in the art can be used without departing from the scope of the present subject matter.

FIG. 5 illustrates an exemplary stacked thick film device output 500. In the exemplary embodiment of FIG. 5, device 100 has one or more second active elements 130 at least partially vertically collocated over one or more first active elements 120, with device 100 configured to do at least one of: directly measure temperature of a heated surface 12, detect boiling initiation 510 at surface 12, detect an onset of critical heat flux 520 at heated surface 12, detect dryout 530, detect impingement 540 (number, frequency, size, and/or location droplets contacting a second active element 130) and/or size and location of droplets impinging one or more second active elements 130 on heated surface 12 as droplets of coolant 20 vaporize. The order of functions listed is exemplary only and does not signify any relative order or importance.

In the exemplary embodiment shown, temperature is measured at the heated surface 12 by at least one second active element 130, with a back wall thermocouple output 550 also shown for comparison. The figure shows temperature responses for a front wall second active element 130 (e.g., a thermistor located at least partially on heated surface 12) output 545 and a back wall thermocouple output 550. The back wall thermocouple output 550 was recorded at 50 Hz using 0.030" (762 microns) diameter back wall thermocouples. Response times for the smallest practical thermocouples (0.005"/127 microns) would be slightly faster but still slower than exemplary thermocouples of the present subject matter.

As shown in FIG. 5, compared to back wall measurement devices (not shown), second active element 130 reveals more process details with improved response time and accuracy including the number and intensity of boiling initiation spikes, the intensity and frequency of CHF boiling, and the intensity and frequency of droplet impingement on the dried-out surface. In instances where the back wall is not accessible or instruments would otherwise interfere with process dynamics, there would be no back wall temperature data available at all.

The exemplary embodiment shown has a very high temporal response (shown here at 50 Hz, but higher speeds are obtainable) with a strong signal to noise ratio. The high temporal response and relatively low signal noise enables thick film device 100 to detect individual bubble and droplet interactions. The signal clarity is achieved in this embodiment using direct current to drive first active element 120, with first active element 120 and second active element 130 electrically isolated (i.e., no common ground) with shielded instrument wiring (not shown). Improved response time and resolution is realized by at least partially mounting thick film device 100 on heated surface 12. Improved accuracy and response time result from second active element 130 being placed in at least partial contact with heated surface 12. In certain embodiments, second active element 130 is placed entirely on heated surface 12.

In the exemplary embodiment of FIG. 5, onset of boiling 510 is indicated by momentary local temperature increases at the site of a forming vapor bubble (not shown). Onset of CHF 520 is indicated as a larger and sustained increase in temperature above saturation. The location of CHF is revealed by measuring the output of one or more second active elements 130 placed at least partially on heated surface 12 and recording which second active element(s) 130 detect(s) the CHF temperature increase first. Droplet impingement 540 is indicated by a second active element 130 measuring an elevated temperature (indicating the temperature sensor is in dryout) experiencing intermittent temperature decreases. These intermittent temperature decreases result from entrained coolant droplets impinging on the dry sensor's surface. Impinging coolant droplets cool the surface as they vaporize, with temperature at the site returning to an elevated temperature once the droplet vaporizes.

In other exemplary embodiments, at least one second active element 130 is configured to be on a heat transfer surface 12 between at least one first active element 120 and coolant 20. In certain exemplary embodiments at least one second active element 130 is no more than nine microns thick and has a minimal thermal mass (i.e., it has a negligible ability to absorb, store and/or release heat). This improves response time over conventional thermocouples, which are 127 microns (0.005") in diameter or larger and have a significantly larger thermal mass. This larger thermal mass delays initial measurements and often distort measurements of actual conditions at the measured environment caused by the large thermal mass thermocouple absorbing portions of the thermal energy in the measured environment.

Figure 6:
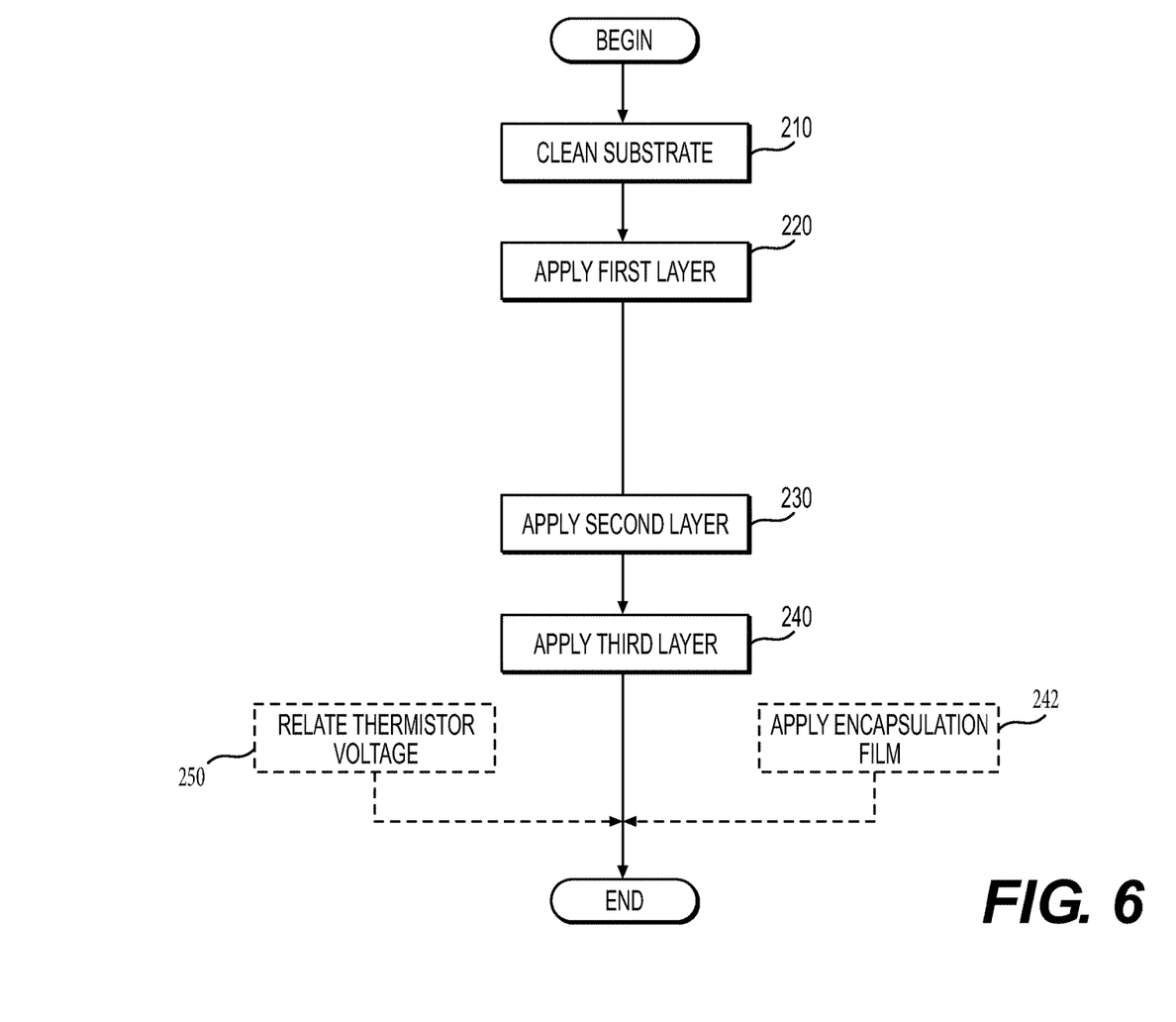
FIG. 6 illustrates an exemplary method of forming a stacked thick film device.

FIG. 6 illustrates an exemplary method 200 of forming a stacked thick film device 100. In the exemplary method of FIG. 6, device 100 has a substrate 110, at least one first active element 120, one or more dielectric layers 140, and one or more second active elements 130 configured to be in at least partial contact with a measured environment 30. While an order of the method steps is provided, this order is exemplary only; as will be recognized by those of skill in the art, the order of the method steps may be varied without impacting the overall efficacy of the method. Moreover, while items are listed in the specification as, for example, "first", "second", or "third" this is used to distinguish one items from another but is not meant to indicate any relative order of the items disclosed.

Certain exemplary methods include the steps of printing, drying, and firing of one or more layers. In certain exemplary embodiments, one or more active elements are stacked in layers, such that they can be manufactured in larger sizes, different circuit patterns, and/or applied to one or more surfaces of a geometric substrate. In certain exemplary methods, a stacked active element thick film device 100 is configured to perform independent functions (heating and measuring, for example) by placing two or more active elements at the same (coincident) location on substrate 110.

In certain exemplary methods, a thick film stack is configured to withstand several thousand rapid thermal cycles of several hundred degrees.

Certain exemplary methods achieve close geometric tolerances, consistent resistance values, and spatial uniformity of the active elements to achieve function. Achieving these close tolerances avoids the need for laser trimming and/or raster trimming, which often degrade device function by damaging one or more of the device layers from heat generated by the trimming. Certain exemplary methods achieve a product yield greater than or equal to 90%, making these exemplary embodiments economical despite high substrate costs.

In the exemplary method of FIG. 6, at step 210 substrate 110 is cleaned at 850 degrees C. in low moisture environment (≤10 degrees C. dew point at atmospheric pressure) for 30 minutes. In this exemplary method substrate 110 is a zirconia ceramic although other substrates with similar flatness and smoothness such as alumina can be used (in place of or in addition to zirconia) without departing from the scope of the present subject matter. In certain exemplary methods of manufacturing substrate 110, processing occurs at temperatures above 246 degrees C. in a low moisture environment (≤10 degrees C. dewpoint at atmospheric pressure). In certain exemplary methods, substrate 110 is a large format rigid engineered substrate configured for a multilayer thick film configured for deposition of one or more high voltage (tested up to 600 Vdc) resistive heating elements 120 with at least one second active element 130 configured to be in at least partial contact with a measured environment 30.

In the exemplary method of FIG. 6, at step 220 a first layer is applied to substrate 310 as first active element 320. In this exemplary method shown, first active element 320 includes a heating element 322 applied to substrate 310 at a desired printing thickness uniformity and firing consistency. This avoids the need for laser trimming and/or raster trimming of the resistive layer, which could introduce non-uniformity in the heater and/or other layers that have not yet been applied to device 300.

In certain exemplary methods, first active element 120 is applied as a resistive paste, with paste resistive value adjusted during wet application such that after one or more firing cycles are complete, resistance is within a desired range. In certain exemplary methods, a desired resistive paste value is found empirically, then repeated by maintaining process variables as consistently as practical. In certain exemplary embodiments, drying time is approximately ten minutes at 150 degrees C. for each layer, followed by a firing cycle lasting approximately thirty minutes at an 850 degrees C. peak temperature for ten minutes. In certain exemplary embodiments, resistor conductors (and sometimes films) are fired before the resistor(s) are fired to minimize the number of resistor refires. In certain exemplary of these exemplary methods, resistor paste value is adjusted during application such that after all firing cycles are complete, resistance is within ±10% of a desired value (from less than ten ohms to tens of thousands of ohms). In certain exemplary embodiments the heater film has an empirically developed sheet resistive value and uniformity of film that does not require adjustments to its specified dimensions, avoiding the need for laser trimming or similar area modification methods, as those methods are undesirable in embodiments having one or more previously-applied overlaying layers.

In the exemplary method of FIG. 6, first active element 120 includes a gold conductor having a fired thickness of at least eight microns. In certain exemplary embodiments first active element 120 includes a resistive film of a known resistive value and film uniformity. This avoids the need for laser trimming or similar area modification methods, which are undesirable to those of skill in the art due to potential damage trimming or area modification would cause to any overlaying dielectric(s). Sheet resistive value is determined by one or more factors including but not limited to heater geometry, heater power output, the driving power supply, the range of commercially available resistor paste values, and resistor film thickness. In certain exemplary methods the process is empirically developed using one or more iterations of these variables, and in certain exemplary embodiments the resistive film has a printed thickness of less than fifteen microns to prevent delamination.

Certain exemplary embodiments include step 230, in which a second layer is added to device 100. In this exemplary embodiment the second layer is a dielectric layer 140 having homogeneous thermal properties. In certain exemplary methods, thermal properties of dielectric layer 140 may be determined by experiment such that a one-dimensional heat conduction model could be applied to the sensor temperature data and the temperature at the heated surface 12 can be calculated.

In the exemplary method of FIG. 6, a third layer is added to device 100 at step 240. In this exemplary method the third layer includes second active element 130, which is added such that dielectric layer 140 separates second active element 130 from first active element 120. (See, e.g., FIGS. 4A and 4B). In certain exemplary embodiments, the second active element 130 is applied as a film, which, in certain embodiments, includes a thermistor baked at 150 degrees C.±10 degrees C. for approximately 24 hours. Other thermistor materials known to those of skill in the art could be used in place of or in addition to this material without departing from the scope of the present subject matter. The layout, sizes and tolerances shown are exemplary only, as other sizes and configurations can be used without departing from the scope of the present subject matter. In this exemplary embodiment, second active element 130 includes one or more thermistors 135 (see, e.g., FIG. 4A) whose resistance has been calibrated to temperature. Certain exemplary thermistors include a twenty microamp input based on room temperature circuit resistance and desired sensitivity. In certain exemplary embodiments, temperature is measured by relating thermistor resistance to the calibrated resistance for the entire thermistor at a known temperature value.

In certain exemplary embodiments at least one second active element 130 is no more than nine microns thick, and in other exemplary embodiments at least one second active element 130 is no more than fifteen microns thick. This improves response time over conventional thermocouples, which are at least 127 microns thick. Back wall thermocouples, in contrast, are separated from heated surface 12 by the thickness of back wall 14 (see, e.g., FIG. 1), which often has unknown or non-homogeneous thermal properties. If the back wall 14 thermal properties are unknown or nonhomogeneous, it may not be possible to calculate the heated surface 12 temperature of interest using measurements obtained at back wall 14. In certain exemplary embodiments, at least one second active element 130 is configured to be in at least partial direct contact with a measured environment 30. In conventional circuits, in contrast, deposition of a second active element on top (coincident) of another active element (i.e., resistor, dielectric, resistor combination) is a discouraged multilayer thick film manufacturing method due to problems with film instability during conventional firing processes.

The exemplary method of FIG. 6 optionally includes step 242, in which an encapsulation film 150 is applied to at least partially cover device 100. Encapsulation film 150 improves the thermistor material electrical response during the boiling phase transition. In certain exemplary embodiments, encapsulation film 150 is a glass encapsulant covering device 100. Other encapsulation films 150 known to those of skill in the art may be used (instead of or in addition to the DuPont film) without departing from the scope of the present subject matter.

Certain exemplary methods optionally include step 250, which relates output voltage of thermistor 135 to temperature using a pointwise calibration of thermistor resistances at known environmental temperatures. This method is exemplary only, as thermistor output voltage can be determined by other methods known to those of skill in the art (in place of or in addition to pointwise calibration). In the exemplary method shown, at least one second active element 130 is configured to be located at a heat transfer surface 12 between first active element 120 and coolant 20. This improves response time and accuracy as shown in the figure above. Improved response time and resolution is realized by at least partially mounting thick film device 100 on heated surface 12. Improved accuracy and response time result from second active element 130 being placed in at least partial contact with heated surface 12. In certain embodiments, second active element 130 is placed entirely on heated surface 12. In yet another exemplary embodiment, at least one second active element 130 is sized to have a minimal thermal mass (i.e., a negligible ability to absorb, store and/or release heat) such that they do not appreciably impact the operation and response of the heating elements.

It will be understood that many additional changes in the details, materials, steps and arrangement of parts, which have been herein described and illustrated to explain the nature of the subject matter, may be made by those skilled in the art within the principle and scope of the present subject matter as expressed in the appended claims.

The invention claimed is:

1. A stacked thick film device, comprising:
   a substrate;
   a first active element;
   a second active element; and
   an insulating dielectric layer separating the first active element and the second active element, wherein the insulating dielectric layer is a thermally homogenous film having a total fired thickness less than 50 microns and includes three layers with different orientations.

2. The stacked thick film device of claim 1, wherein the substrate is a large format rigid engineered substrate.

3. The stacked thick film device of claim 2, wherein the large format rigid engineered substrate is ceramic.

4. The stacked thick film device of claim 3, wherein the large format rigid engineered substrate is a stabilized zirconia ceramic with 20 micro-inch Ra or smoother surface finish and a free-state flatness of less than 25 microns per 150 centimeters.

5. The stacked thick film device of claim 1, wherein the first active element includes a heater.

6. The stacked film device of claim 5, wherein the heater is a resistive film.

7. The stacked thick film device of claim 6, wherein the heater includes at least one high voltage resistive heating element.

8. The stacked thick film device of claim 6, wherein the resistive film is less than 15 microns thick.

9. The stacked thick film device of claim 8, wherein the resistive film includes a gold conductor having a fired thickness of 9 microns.

10. The stacked thick film device of claim 1, wherein the second active element includes at least one measurement element.

11. The stacked thick film device of claim 10, wherein the at least one measurement element is configured to be located at a heat transfer surface between a heat source and a cooling fluid.

12. The stacked thick film device of claim 11, wherein the at least one measurement element includes at least one measurement circuit configured to be in direct contact with a sensed environment.

13. The stacked thick film device of claim 12, wherein the at least one measurement circuit includes at least one temperature sensor.

14. The stacked thick film device of claim 13, wherein the at least one temperature sensor is a thermistor.

15. The stacked thick film device of claim 13, wherein the temperature sensor is configured to do at least one of:
   measure temperature of an actively heated surface;
   detect boiling initiation at the heated surface;
   detect an onset of critical heat flux at the heated surface; and
   detect impingement of coolant droplets on the heated surface.

16. The stacked thick film device of claim 15, further comprising an array of temperature sensors.

17. The stacked thick film device of claim 1, wherein the first active element and the second active element are vertically collocated on the substrate.

18. The stacked thick film device of claim 17, further including an encapsulation film encapsulating the thick film device.

19. A stacked thick film device, comprising:
   a substrate;
   a first active element;
   a second active element; and
   an insulating dielectric layer separating the first active element and the second active element, wherein
   the insulating dielectric layer is a thermally homogenous film having a total fired thickness less than 50 microns, and
   the second active element includes a thermistor having a temporal response of approximately 6 microseconds or less.

20. The stacked thick film device of claim 19, wherein the thermistor is a film having a resistance between 25 k$\Omega$ and 60 k$\Omega$ at 21 degrees centigrade.

21. The stacked thick film device of claim 20, wherein the thermistor film has a minimal thermal mass and is up to 9 microns thick.

22. A stacked thick film device, comprising:
   a substrate;
   a first active element;
   a second active element; and
   an insulating dielectric layer separating the first active element and the second active element, wherein the insulating dielectric layer
   is a thermally homogenous film having a total fired thickness less than 50 microns,
   includes three layers with different orientations, and
   has a 1000 VDC minimum electrical breakdown strength.

* * * * *